(12) United States Patent
Kanno et al.

(10) Patent No.: US 6,309,438 B1
(45) Date of Patent: Oct. 30, 2001

(54) FILTER UNIT AND DUST-PROOF MASK THEREWITH

(75) Inventors: Tomoaki Kanno, Hatano; Kunio Yamada, Tokorozawa; Hirohisa Umezaki, Fujidera, all of (JP)

(73) Assignee: Mine Safety Appliances Company, Pittsburgh, PA (US)

( * ) Notice: Subject to any disclaimer, the term of this patent is extended or adjusted under 35 U.S.C. 154(b) by 0 days.

(21) Appl. No.: 09/439,437

(22) Filed: Nov. 15, 1999

(30) Foreign Application Priority Data

Nov. 16, 1998 (JP) .................................................. 10-324929
Nov. 17, 1998 (JP) .................................................. 10-326619

(51) Int. Cl.$^7$ .................................................. B01D 39/16
(52) U.S. Cl. ............................................. 55/486; 55/528
(58) Field of Search .......................... 55/528, 527, 500, 55/DIG. 5, 486; 264/290.2

(56) References Cited

U.S. PATENT DOCUMENTS

| | | | | |
|---|---|---|---|---|
| 4,187,390 | * | 2/1980 | Gore | 55/528 |
| 4,877,433 | * | 10/1989 | Oshitari | 55/486 |
| 5,551,984 | * | 9/1996 | Tanahashi | 118/724 |
| 6,027,553 | * | 2/2000 | Hirano et al. | 95/283 |

* cited by examiner

Primary Examiner—David A. Simmons
Assistant Examiner—Robert A. Hopkins
(74) Attorney, Agent, or Firm—James G. Uber

(57) ABSTRACT

The present invention provides a filter containing a filter material folded into a chrysanthemum shape. While such a filter can be made of an electret fiber nonwoven fabric or a fiberglass nonwoven fabric, preferably it is made of a polytetrafluoroethylene porous film that is extended lengthwise and widthwise such that the overall area is extended by more than fifty-fold.

8 Claims, 2 Drawing Sheets

FILTER UNIT AND DUST-PROOF MASK THEREWITH

FIELD OF THE INVENTION

The present invention relates to a folded filter unit using a polytetrafluoroethylene (PTFE) porous film with superior dust collection efficiency. The present invention also relates to a folded chrysanthemum-shaped filter unit with high dust collection efficiency and low inhalation resistance.

BACKGROUND OF THE INVENTION

Some current dust-proof and gas-proof masks contain filter units that are made from a nonwoven synthetic fiber filter material such as polypropylene, which is also used in air filters. Electrostatic filters have been proposed to reduce breathing resistance and mechanical filters which use a fiberglass fiber as the base material have also been proposed.

Unfortunately, there are many problems with these filters. For example, in the case of electrostatic filters, microfibers adhere to the filter material and collect in the folds. Oil mist reduces the electrostatic properties and lowers the dust collection efficiency of the filter. In the case of mechanical filters whose base material is fiberglass, the high dust collection efficiency produces increased resistance (inhalation resistance in the case of masks). It would be desirable therefore to have a filter unit for air filters, dust-proof masks and gas-proof masks with low pressure drop, (i.e., low inhalation resistance) and superior dust collection efficiency. The inhalation resistance and filter area have to be such that the filter unit can be placed inside a restricted area in front of an air filter unit or dust-proof mask. Each filter also has to be designed to collect as much dust as possible. A pleated filter with an expanded filter area has been disclosed (Japanese Unexamined Patent Application Publication [Kokai] No. 8-168629) which reduces inhalation resistance and increases the amount of dust collected.

In order to filter out dust particles the size of a single micron, the inhalation resistance of the filter has to be configured to accommodate fibers the size of a single micron. When a filter consisting of fibers the size of a single micron is folded into pleats, the filter has to be reinforced so as to be strong enough to withstand the air pressure due to inhalation resistance and also to resist mechanical vibration. The mechanical strength of the material used in the folded filter is weak, but this problem can be solved by increasing the thickness of the filter using a reinforcing material. This has to be done while maximizing the dust collection efficiency, minimizing inhalation resistance, and allowing the filter unit to be easily manufactured.

SUMMARY OF THE INVENTION

Generally the present invention relates to a filter wherein the dust collection efficiency has been improved by using a highly extended porous PTFE film with a specific fiber diameter, pore diameter, film thickness and porosity. The dust collection efficiency of such a filter is further improved by folding the film in the direction of high extension.

One embodiment of the present invention is a folded filter characterized in that the extended area scaling factor is extended by a factor of 45 or higher, and that a polytetrafluoroethylene porous film is used with a fiber diameter of 0.05 to 0.2 $\mu$m, and a porosity of 40 to 97%. The polytetrafluoroethylene porous film in the folded filter is folded in the direction with the higher extended area scaling factor, and a nonwoven polyolefin spun bond with a capped structure is used as a laminate for the polytetrafluoroethylene porous film. The folded filter of the present invention is used in dust-proof masks and gas-proof masks.

Dust-proof masks and gas-proof masks using the filter of the present invention utilize a highly extended PTFE porous film as the filter material which is folded in the direction of greater extension. As a result, the dust collection efficiency of these masks exceed 99.99% and the inhalation resistance is remarkably low.

In another embodiment of the present invention, the filter material is folded into a chrysanthemum shape. In this configuration, the filter material can be an extended polytetrafluoroethylene porous film, an electret fiber nonwoven fabric, or a fiberglass nonwoven fabric.

Other details, objects and advantages of the present invention will be readily apparent from the following description of the presently-preferred embodiments.

BRIEF DESCRIPTION OF THE DRAWINGS

In the accompanying drawings, a presently preferred embodiment of the present invention is shown by way of example only, wherein.

DESCRIPTION OF THE PREFERRED EMBODIMENTS

Figure 1:
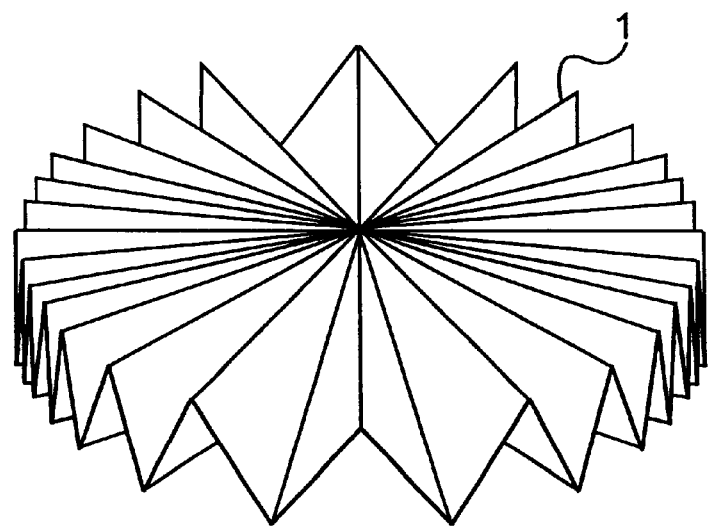
FIG. 1 is a perspective view of the folded chrysanthemum-shaped filter material of the present invention.

The PTFE film used in one embodiment of the present invention is a highly extended semi-baked PTFE. Despite a small pore diameter, the porous film does not cause much pressure drop across the filter (i.e., inhalation resistance).

The porous PTFE film is formed by extruding a mixture of fine PTFE powder and a lubricant, and then the (1) unbaked film is extended, (2) baked film is extended, or (3) semi-baked film is extended. Of these three methods, the most well-known involves heat processing the film before extension. Extending semi-baked film biaxially increases the extension scaling factor while reducing the diameter of the pores. In this way, an extremely thin porous film can be obtained consisting of fibers that have joints with substantially large dimensions (Japanese Unexamined Patent Application [Kokai] No. 59-152825 and Kokai No. 5-202217). Porous PTFE film manufactured using this method is not only a film consisting of fibers that have joints with substantially large dimensions, but the average pore diameter is small and the thickness of the film is $\frac{1}{20}$ th to $\frac{1}{100}$ th the thickness of the film before extension.

The highly extended semi-baked PTFE film used in this embodiment of the present invention is obtained by expanding or extending the film by an extension rate lengthwise and widthwise of 45 fold or more, and ideally 100 fold or more, in terms of area, and then baked. The extended area scaling factor is obtained by multiplying the extension rate lengthwise by the extension rate widthwise. The extension rate in terms of direction is 5-fold or more lengthwise and 5-fold or more widthwise. A film that has an extended area scaling factor (i.e., the extension rate lengthwise times the extension rate widthwise) of less than 45 will have joints with substantially large dimensions, which has the adverse effect of lowering the dust collection efficiency of the filter unit.

Preferably, the fiber diameter of the PTFE porous film used in this embodiment of the present invention is 0.05 to 0.2 $\mu$m and ideally 0.08 to 0.15 $\mu$m. The average pore diameters is 0.1 to 0.5 $\mu$m, and ideally 0.2 to 0.5 $\mu$m. The thickness of the film is 0.1 to 20 $\mu$m and the porosity is between 40 and 97%.

The PTFE porous film used in this embodiment of the present invention has extremely small fibers joined in a three-dimensional structure. Photographs of these fibers scanned under an electronic microscope reveal the large dimension joints greater than 1 $\mu$m at intersection points, convergence points and bending points of fibers to be extremely small in number.

In order to expand the filtration area of the PTFE porous film used in this embodiment of the present invention, the film is pleated to create an ultrafine dust collecting filter unit. The folds should be made in the direction with the greater extension rate. For example, a PTFE porous film with an expanded area of 50 fold, 5 fold lengthwise and 10 fold widthwise, is folded widthwise into a filter unit. By folding the film in the direction with the greater extension rate, the fine-particle collection efficiency is further improved.

The PTFE porous film used in the filter of the present invention can be used without modification. However, in order to improve the strength and folding characteristics of this film, one or both sides of the PTFE porous film should be laminated with a reinforcing material. The reinforcing laminate should be another low pressure porous material added before the PTFE porous film is pleated.

The reinforcing film can be a nonwoven fabric, woven fabric, or mesh. Examples of reinforcing materials include polyolefin (e.g., polyethylene, polypropylene), nylon, polyester, amides (aromatic polyamides) or a mixture of these materials (e.g., capped or uncapped nonwoven fabric can be used or a two-layered nonwoven fabric consisting of a low melting point material and a high melting point material) Other examples include a fluoride porous film (e.g., PFA which is a tetrafluoroalkylvinylether copolymer and FEP which is a tetrafluoroethylene-hexafluoropropylene copolymer).

A two-layered nonwoven fabric consisting of a low melting point material and a high melting point material is preferred. The fabrics can be a composite fiber with a capped and uncapped structure, with the capped component being a low melting point resin. For example, a polyethylene fine spun bond fabric can be used in which the composite fiber with a capped and uncapped structure is polyethylene, and the capped component with a low melting point resin is polypropylene. Other examples include polyester fine spun bond fabrics and polypropylene fine spun bond fabrics that are sprayed with a low melting point hot melt powder or hot melt resin. These reinforcing materials should not constrict when the film is laminated. These reinforcing material laminate films make it easier to manufacture HEPA filters and ULPA filters and make it easier to increase the pitch of the fold in the filter element.

As for the lamination itself, the PTFE porous film used in the filter of the present invention should be laminated on one or both sides with the reinforcing material. The appropriate lamination method should be selected from among the known methods, although melting some of the reinforcing material and applying it using heat and pressure is recommended as is the application of the reinforcing material using heat, pressure and a hot melt resin.

The highly extended PTFE folded filter material of the present invention is preferably a composite film with an attached nonwoven reinforcing material. It is folded in the direction that is more extended to form a filter element. It can be used as an air filter such as an ULPA filter or a HEPA filter, or it can be used in a filter cartridge with a dust-proof mask or gas-proof mask.

Dust-proof masks and gas-proof masks using the filter element of the present invention have to meet the following requirements. These masks have to be configured so that they cover the mouth and nostrils of the user. The area should include the main body of the mask, an inhalation valve, a covered exhalation valve, and a filter connector or holder on the left and right side. Preferably, the filter holder is on the inside of the central opening in the mask so as to allow for respiration. The inside wall of the holder is circular with threads while the filter cartridge itself is circular with threads on the outside surface so that the filter cartridge can be screwed and unscrewed from the filter holder at will.

The inhalation resistance and filter area have to be such that the filter cartridge can be placed inside a restricted area in front of the dust-proof mask or gas-proof mask. Each filter also has to be designed to collect as much dust as possible. Therefore, the filter material has to be folded into pleats in order to increase the surface area of the folder, reduce inhalation resistance, and increase the amount of dust collected. It is essential that the PTFE porous filter of the present invention be used in the direction of the folds in order to improve the dust collection efficiency.

In order to filter out dust particles the size of a single micron, the inhalation resistance of the filter has to be configured to accommodate fibers the size of a single micron. When a filter consisting of fibers the size of a single micron is folded into pleats, the filter has to be reinforced so as to be strong enough to resist the air pressure due to inhalation resistance and also to resist mechanical vibration. The mechanical strength of the material used in the folded filter is weak, but this problem can be solved by increasing the thickness of the filter using a reinforcing material. Thus, a PTFE porous film laminated with a reinforcing material is more useful.

Dust-proof masks and gas-proof masks using the filter of the present invention utilize a highly extended PTFE porous film as the filter material which is folded in the direction of greater extension. As a result, the dust collection efficiency of the masks exceed 99.99% and the inhalation resistance is remarkably low.

WORKING EXAMPLES

The following is a more detailed explanation of the present invention with reference to working examples and comparative examples. The present invention is by no means limited to these working examples. The following methods were used to obtain the measurements in the detailed explanation of the present invention and the working examples.

(1) Pressure Loss: The filter material was pleated to form a filter unit 65 mm in diameter. The filter unit was then attached to a housing and the pressure loss was measured using an instrument for measuring pressure (manometer) with the ventilation set at 20 liters per minute. Fifty measurements were made per sample, and the average value was used as the pressure loss for the material.

(2) Dust Collection Efficiency: With the same instrument used to measure pressure loss, $10^7$ particles per liter of 0.3 $\mu$m to 0.4 $\mu$m dioctylphthalate (DOP) particles were passed upstream with the ventilation set at 20 liters per minute. The downstream concentration of DOP was measured using a particle counter and the following equation was used to determine the dust collection efficiency.

Dust Collection Efficiency (%)=[1−(downstream conc./upstream conc.)]×100

(Here, the particles ranged in size between 0.3 $\mu$m and 0.4 $\mu$m.

(3) Leak Test: In measuring the dust collection efficiency, the number of samples in which particles greater than 0.4 $\mu$m in size were counted downstream was used as the value for the leak test.

(4) Average Pore Size: A Coulter porometer (made by Coulter Electronics) was used to determine the mean flow pore size.

(5) Film Thickness: A Tek-Iok SM-1201 dial gauge (capable of film thickness measurements of $\frac{1}{1000}$mm) was used to measure the thickness of a stack of 12 porous films and the overall thickness was then divided by 12.

Working Example 1

Semi-baked PTFE was extended lengthwise by a factor of 20 and widthwise by a factor of 34 to expand the area of the PTFE by a factor of 680. The PTFE was then baked. A PTFE composite was then obtained by interposing an expanded PTFE porous film with a thickness of 1 $\mu$m, a pore diameter of 0.3 $\mu$m, a fiber diameter of 0.14 $\mu$m and a porosity of 52% between 30 g/m$^2$ of capped nonwoven spun bond consisting of polypropylene and polyethylene (Elbeth T0303WDO made by Unica Corp.). The PTFE composite was then folded widthwise to form folds that were 30 mm wide and 19 mm high. Twenty folded cartridge filter units with 21 peaks were prepared in this manner.

The pressure loss for these filter units measured at a ventilation of 20 liters per minute was 2.5 mm H$_2$O and the dust collection efficiency was greater than 99.99% when DOP particles with a diameter of 0.3 to 0.4 $\mu$m were used at a ventilation of 20 liters per minute. The leak test value was four. No joints with dimensions greater than 1 $\mu$m were detected when the PTFE porous material was examined under a scanning electron microscope (SEM).

Working Example 2

Unbaked PTFE was extended lengthwise by a factor of 5 and widthwise by a factor of 20 to expand the area of the PTFE by a factor of 100. The PTFE was then baked. A PTFE composite was then obtained by interposing an expanded PTFE porous film with a thickness of 5 $\mu$m, a pore diameter of 0.28 $\mu$m, a fiber diameter of 0.15 $\mu$m and a porosity of 71% between 30 g/m$^2$ of capped nonwoven spun bond consisting of polypropylene and polyethylene (Elbeth T0303WDO made by Unica corp.). The PTFE composite was then folded widthwise to form folds that were 30 mm wide and 19 mm high. Twenty folded cartridge filter units with 21 peaks were prepared in this manner.

The pressure loss for these filter units evaluated under the same conditions as Working Example 1 was 3.0 mm H$_2$O and the dust collection efficiency was greater than 99.99%. The leak test value was three. No joints with dimensions greater than 1 $\mu$m were detected when the PTFE porous material was examined under a scanning electron microscope (SEM).

Working Example 3

The PTFE composite in Working Example 2 was folded lengthwise to form folds that were 30 mm wide and 19 mm high. Twenty folded cartridge filter units with 21 peaks were prepared in this manner. The pressure loss for these filter units evaluated under the same conditions as Working Example 2 was 3.1 mm H$_2$O and the dust collection efficiency was greater than 99.99%. The leak test value was five.

Comparative Example 1

The PTFE porous film extended lengthwise and used in a 0.1 $\mu$m Millipore Fluoroguard TP cartridge filter was extended yet again lengthwise by a factor of six on a roller surface heated to 300° C. A PTFE composite was then obtained by interposing the expanded PTFE porous film between 30 g/m$^2$ of capped nonwoven spun bond consisting of polypropylene and polyethylene (Elbeth T0303WDO made by Unica Corp.). The PTFE composite was then folded lengthwise in the same manner as Working Example 1 to prepare 20 filter units.

The pressure loss for these filter units evaluated under the same conditions as Working Example 1 was 12.3 mm H$_2$O and the dust collection efficiency was greater than 99.99%. The leak test value was six. No joints with dimensions greater than 1 $\mu$m were detected when the PTFE porous material was examined under a scanning electron microscope (SEM).

Comparative Example 2

Twenty filter units were prepared in the same manner as Working Example 1 using the high alpha HEPA grade 4350 fiberglass filter material made by Lydall Co. Ltd. (basis weight 75 g/m$^2$, thickness 0.38 mm). The pressure loss for these filter units evaluated under the same conditions as Working Example 1 was 8.0 mm H$_2$O and the dust collection efficiency was greater than 99.99%. The leak test value was one.

In another embodiment of the present invention, the filter material is folded into a chrysanthemum shape. The method of folding the filter material into a chrysanthemum shape depends on the properties of the filter material. However, it is usually pleated in a specific shape. The continuous bellow-shaped sheet manufacturing device disclosed in Kokai No. 3-49928 can be used to fold the sheet with consistent dimensions, the rotary method or reciprocating method can be used to pleat the filter material lengthwise. However, the fan-shaped folding device disclosed in Kokai No. 59-53084 can also be used to fold the filter material in a waveform. The ends of a filter material folded into a specific number of peaks with a specific width are then bonded together using heat fusion or a bonding agent to form the chrysanthemum-shaped filter shown in FIG. 1. If necessary, hot melt can be applied to the center of the chrysanthemum to block the hole.

In this embodiment of the present invention, the size of the filter material folded into the chrysanthemum shape depends on the capacity of the casing. Normally, the width of the material itself ranges between 3 and 270 mm, and ideally between 5 and 100 mm. The height of the folds should range between 5 and 40 mm, ideally between 10 and 30 mm, and the number of peaks should range between 20 and 100, ideally between 30 and 60.

Preferably, the filter material which is folded into a chrysanthemum shape is placed inside a casing and the gaps between the filter material and the casing are sealed with hot melt, or the filter material folded into a chrysanthemum shape is placed between an upper and lower casing with tooth-like protrusions.

When the filter material folded into a chrysanthemum shape is placed between an upper and lower casing with tooth-like protrusions, the filter is folded so that the number of folds in the chrysanthemum shape is the same as the number of protrusions on the upper and lower casings, which are made out of a synthetic resin. The tips of the chrysanthemum-shaped folds are placed between the protrusions in the casings. A structure can be used to support the filter unit if necessary (any configuration can be used so long as the filter unit is supported). A specific amount of pressure is then applied around the filter material to complete the folded filter unit.

Figure 2:
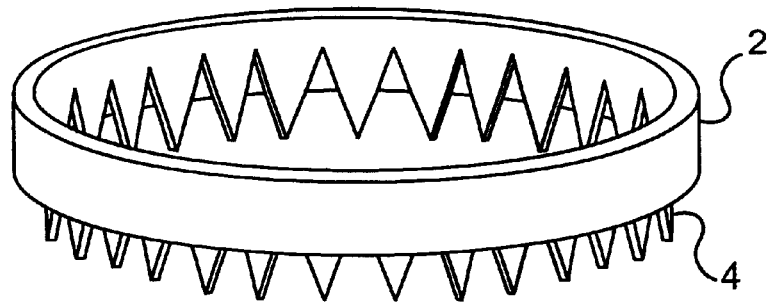
FIG. 2 is a perspective view of the upper and lower casings of the filter of the present invention.
Figure 2:
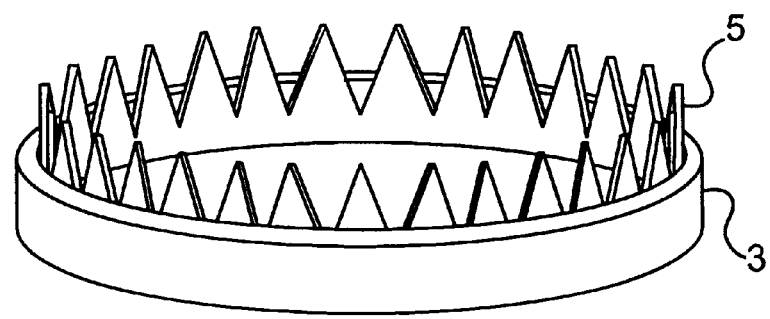
Figure 3:
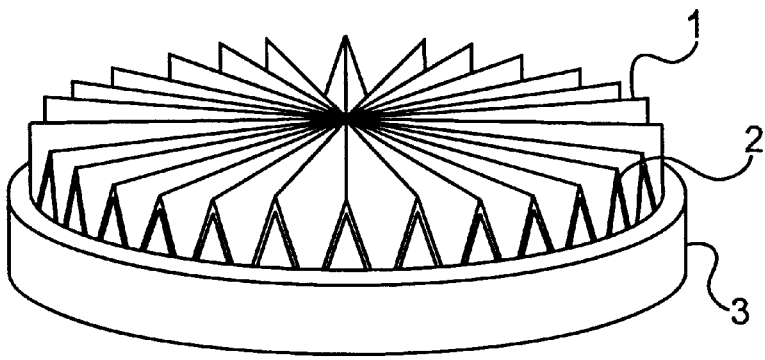
FIG. 3 is a perspective view of the chrysanthemum-shaped filter resting in the lower casing.
Figure 4:
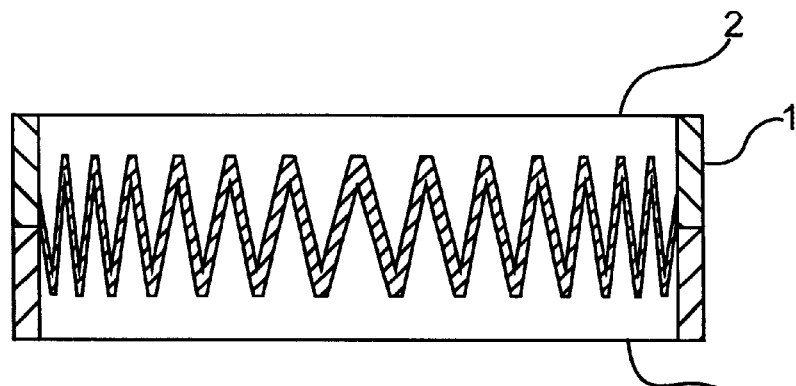
FIG. 4 is a horizontal cross-sectional view of the filter of the present invention.

The chrysanthemum-shaped filter material 1 shown in FIG. 1, for example, can be interposed between the upper and lower casings 2, 3 shown in FIG. 2. The upper casing 2 has a number of teeth 4 that is identical to number of folds in the chrysanthemum-shaped filter material 1. The tips of the chrysanthemum-shaped filter material 1 can be housed between the teeth 5 in the lower casing 3 in similar fashion. FIG. 3 is a perspective view of the folded chrysanthemum-shaped filter 1 resting on the lower casing 3. When the upper casing 2 is placed over the filter material, the filter unit is complete. FIG. 4 is a horizontal cross-sectional view of the folded filter interposed between the upper and lower casing.

As shown in FIG. 4, the filter material folded in a chrysanthemum shape is interposed between the teeth in the upper and lower casing. As a result, the filter material is securely attached to the casing. The contact points between the filter material and the casing does not leak even though they are not sealed with hot melt. The manufacturing process is simple and there are fewer leaks than filter units using hot melt.

Figure 5:
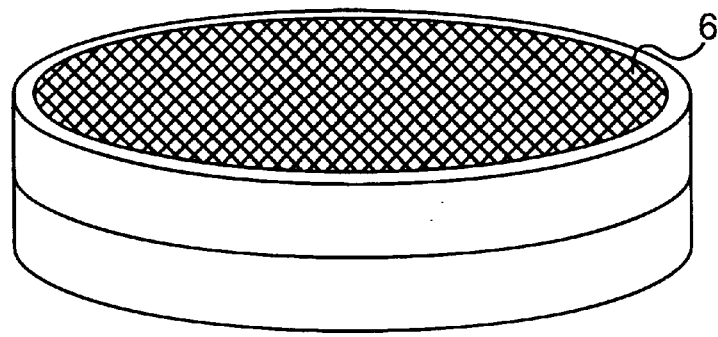
FIG. 5 is a perspective view of a filter cartridge of the present invention wherein a mesh frame is placed over the casing containing the filter material of the present invention.

Because the interposed filter material is supported by the casings themselves, a metal mesh 6 can be laced over the upper and lower casings as shown in FIG. 5.

The following materials can be used for the chrysanthemum-shaped filter material in the present invention:

(1) Nonwoven Fabric of Electret Fibers

A nonwoven fabric of electret fibers can be used for the chrysanthemum-shaped filter material in the present invention. A melt flow laminated fabric electret made using a thermoplastic resin can be used. There are no restrictions on the thermoplastic electret method. Any one of the more well-known methods can be used.

For example, the thermoplastic resin film can be heated to melt or soften the resin and the film can become electret by cooling it while applying a high voltage DC charge (the heat electret method); a corona discharged or high pulse voltage can be applied to the surface of the thermoplastic film and both surfaces can be held by a dielectric while a direct current is applied to both surfaces to make the film electret (the electro-electret method); or the film can be irradiated with electrons or gamma rays to make the film electret (the radio-electret method).

In the method for creating an electret nonwoven fabric directly, fibers which have been passed through an electric field in a liquid are collected on the base layer of a sheet and an electret laminate nonwoven fabric is formed. In this method, the strength of the electric field has to be maintained at a constant level. The electret effect is greatest when the fibers are passed through an electric field in excess of 1 kV/cm in a liquid and then collected on the base layer of a sheet. If the field is less than 1 kV/cm, it is difficult to achieve a corona discharge of sufficient strength. As a result, the electret properties are poor and the surface charge density is low. When the material is used in a filter unit, the filtering properties are low. Therefore, when an electret nonwoven laminate fabric is used, the electric field should be greater than 1 kV/cm but less than 3 kV/cm. The electret nonwoven fabric obtained using this method has a charge due to the fibers accumulated on the surface of the laminate. The charge is increased by repeating the process. The electret process is completed when the film is moved to the ground electrode and the electric field disappears. The nonwoven fabric as a whole has a high charge and superior electret properties.

Examples of thermoplastic resins include single polymers such as low-density polyethylene, high-density polyethylene, polypropylene, poly-1-butene and poly-4-methyl1-pentene as well as α-olefin random and block copolymers of ethylene, propylene, 1-butene and 4-methyl-1-pentene. These also include ethylene-acrylate copolymers, ethylene-vinylacrylate copolymers, ethylene-vinylalcohol copolymers, other ethylene-vinyl compound copolymers, polystyrene, acrylonitrile-styrene copolymers, acrylonitrile-butadiene-styrene copolymers, methylmetha-crylate-styrene copolymers, α-methylstyrene-styrene copolymers, other sytrene copolymers, polyvinyl chloride, polyvinyl vinylidene chloride, vinylidene chloride copolymers, vinyl chloride copolymers, methylpolyacrylate, methylpolymethacrylate, and other polyacrylic acid esters. Other examples include nylon 6, nylon 6-6, nylon 6-10, nylon 11, nylon 12, other polyamides, polyethylene terephthalate, other thermoplastic polyesters, polycarbonate and polyphenyloxide. These resins can be used alone or in combinations of two or more.

(2) Polytetrafluoroethylene Porous Film (PTFE Film)

The PTFE film used as the filter material in the chrysanthemum-shaped filter unit of the present invention is obtained by mixing a PTFE fine powder with a lubricant, extruding the paste, and then extending the paste after the lubricant has been removed. Whether or not the PTFE is baked depends on the type of film.

For example, there is a method (a) in which unbaked PTFE paste is extended. After the lubricant has been removed from the PTFE paste, the paste is extended axially at a relatively fast rate and at a temperature beneath the melting point of the PTFE. The PTFE film obtained in this manner has fine fibers with large-dimension joints greater than 1 μm at intersection points and a high porosity between 40 and 97%. The special characteristic of this method is that the film can be extended to a large degree without reducing the thickness of the film by a similar degree. Here, the PTFE film is extended to a large degree by expanding the number and size of gaps between the joints and fibers.

Another method (b) involves extending a baked PTFE paste. In this method, the PTFE paste is heated to its melting point and extended above its melting point. In this method, the film is extended perpendicular to the direction of the pressure, but a porous film with high porosity cannot be obtained using this method.

The most well-known method is (c), which involves heat processing the PTFE paste before extension. Extending semi-baked film biaxially increases the extension scaling factor while reducing the diameter of the pores. In this way, an extremely thin porous film can be obtained consisting of fibers that have joints with substantially large dimensions. Porous PTFE film manufactured using this method is not only a film consisting of fibers that have joints with substantially large dimensions, but the average pore diameter is small (0.1 to 0.5 $\mu$m) and the thickness of the film is 1/20 th to 1/100 th the thickness of the film before extension.

The method used to obtain the filter material in the chrysanthemum-shaped filter unit of the present invention depends on the purpose and use of the filter. However, the PTFE obtained using method (c) is preferred because of its high dust collection efficiency. The PTFE is especially ideal because the area of the semi-baked paste can be expanded 50 fold lengthwise and widthwise.

The folds should be made in the direction with the greater extension rate. For example, a PTFE porous film with an expanded area of 50 times, 5 times lengthwise and 10 times widthwise, is folded widthwise into a filter unit. By folding the film in the direction with the greater extension rate, the fine-particle collection efficiency is improved.

(3) Polypropylene Nonwoven Fabric:

Polypropylene nonwoven fabric used as the filter material in the chrysanthemum-shaped filter unit of the present invention should be a single polypropylene meltblown sheet, but a laminated polypropylene meltblown sheet can also be used. Spun bond and synthetic net laminates are also possible. The lamination method can be any well-known method such as the thermal binder or thermal embossing method. The preferred method is to laminate the meltblown sheet with the laminate material directly on the meltblown fabric production line. The basis weight in the nonwoven fabric should range between 10 and 200 g/m$^2$, and the pressure loss should be kept to a minimum between 15 and 80 g/m$^2$. The nonwoven fabric can be laminated or used unaltered. The reinforcing material can be a synthetic fabric or net made from polyethylene terephthalate, nylon or polypropylene.

(4) Nonwoven Fiberglass Fabric

Nonwoven fiberglass fabric can be used to make the chrysanthemum-shaped filter of the present invention. The fiberglass used in HEPA filters and ULPA filters to collect particles of dust on the submicron level is especially ideal. The nonwoven material can contain a small amount of extremely fine-chopped strand fiberglass with a diameter of less than 20 $\mu$m. An organic binder can also be added for reinforcement.

(5) Reinforcing Material

A reinforcing material can be added to the chrysanthemum-shaped folded filter material of the present invention if necessary to make the filter material stronger and easier to handle.

The reinforcing film can be a nonwoven fabric, woven fabric, or mesh. Examples of reinforcing materials include polyolefin (e.g., polyethylene, polypropylene), nylon, polyester, amides (aromatic polyamides) or a mixture of these materials (e.g., a capped or uncapped nonwoven fabric can be used or a two-layered nonwoven fabric consisting of a low melting point material and a high melting point material). Other examples include a fluoride porous film (e.g., PFA which is a tetrafluoroalkylvinylether copolymer and FEP which is a tetrafluoroethylene-hexafluoropropylene copolymer). A two-layered nonwoven fabric consisting of a low melting point material and a high melting point material is ideal. These reinforcing material laminate films make it easier to manufacture HEPQ filters and ULPA filters and make it easier to increase the pitch of the fold in the filter element.

The laminate should be rigid enough to allow the filter material to be pleated yet avoid contact with the filter material while in use. It should also be strong enough if necessary to allow the filter material to form a cylinder while keeping the filter material thin.

If hot melt is used, it should be partially but not wholly fused. Examples of hot melt agents include acrylic, styrene, vinylchloride, monoolefin, diolefin and other polymers (these are referred to as resins, but some may include rubber), polyamide, polyurethane, polyester, polyimide and other thermoplastic resins, and epoxy resins, urea resins, phenol resins, melamine resins, polyester resins and other heat-hardened resins.

Working Example 1

Twenty, folded 65 mm diameter cartridge filters were prepared using the high alpha HEPA grade 4350 fiberglass filter material made by Lydall Co. Ltd. (basis weight 75 g/m$^2$, thickness 0.38 mm). The material was pleated to form folds with 41 peaks that were 30 mm wide and 19 mm high. An end plate consisting of 50 g/m$^2$ nonwoven fabric with hot melt applied was heat fused to the end surfaces of the pleated product to form a cylinder. After the chrysanthemum-shaped folded filter unit had been completed, hot melt was applied to the contact points between the filter unit and the housing and at the center of the filter unit.

The pressure loss for these filter units measured at a ventilation of 20 liters per minute was 4.5 mm H$_2$O and the dust collection efficiency was greater than 99.99% when DOP particles with a diameter of 0.3 to 0.4 $\mu$m were used at a ventilation of 20 liters per minute. The leak test value was two.

Working Example 2

Twenty, folded 65 mm diameter cartridge filters were prepared in the same manner as Working Example 1 except that Microtech TT-1, a PTFE porous film made by Nitto Denko Co., Ltd., was used. The pressure loss for these filter units measured at a ventilation of 20 liters per minute was 2.5 mm H$_2$O and the dust collection efficiency was greater than 99.99% when DOP particles with a diameter of 0.3 to 0.4 $\mu$m were used at a ventilation of 20 liters per minute. The leak test value was two.

Comparative Example 1

Twenty folded 65 mm diameter cartridge filters were prepared using the high alpha HEPA grade 4350 fiberglass filter material made by Lydall Co. Ltd. (basis weight 75 g/m$^2$, thickness 0.38 mm). The material was pleated to form folds with 21 peaks that were 50 mm wide and 19 mm high. After being formed into a cylinder, the folder was not sufficiently rigid. As a result, the ends buckled and the shape of the cylinder was not neat. The round filter unit was inserted into the casing, and hot melt was applied between the filter and the casing.

The pressure loss for these filter units measured at a ventilation of 20 liters per minute was 6.3 mm H$_2$O and the dust collection efficiency was greater than 99.99% when DOP particles with a diameter of 0.3 to 04. $\mu$m were used at a ventilation of 20 liters per minute. The leak test value was eight.

Comparative Example 2

Twenty folded 65 mm diamter cartridge filters were prepared in the same manner as Working Example 2, except that Microtech TT-1, a PTFE porous film made by Nitto Denko Co., Ltd., was used. The pressure loss for these filter units measured at a ventilation of 20 liter per minute was 3.5 mm $H_2O$ and the dust collection efficiency was greater than 99.99% when DOP particles with a diameter of 0.3 to 04. $\mu$m were used at a ventilation of 20 liter per minute. The leak test value was ten.

What is claimed is:

1. A folded filter unit comprising a biaxially expanded polytetrafluoroethylene porous film such that the extended area scaling factor is at least 45 and wherein the film has a fiber diameter of 0.05 to 0.2 $\mu$m, an average pore diameter of 0.1 to 0.5 $\mu$m, a thickness of 0.1 to 20 $\mu$m, and a porosity of 40 to 97%.

2. A folded filter unit according to claim 1, wherein the polytetrafluoroethylene porous film is folded in the direction with the higher extended area scaling factor.

3. A folded filter unit according to claim 1 and claim 2, wherein a nonwoven polyolefin spun bond with a capped structure is used as a laminate for the polytetrafluoroethylene porous film.

4. A dust-proof or gas-proof mask using a folded filter unit according to claim 1.

5. A folded filter unit comprising a biaxially expanded polytetrafluoroethylene porous film such that the extended area scaling factor is at least 100 and wherein the film has a fiber diameter of 0.05 to 0.2 $\mu$m, an average pore diameter of 0.1 to 0.5 $\mu$m, a thickness of 0.1 to 20 $\mu$m, and a porosity of 40 to 97%.

6. A folded filter unit according to claim 5, wherein the polytetrafluoroethylene porous film is folded in the direction having the higher expansion factor.

7. A folded filter unit according to claim 5, wherein a nonwoven polyolefin spun bond with a capped structure is used as a laminate for the polytetrafluoroethylene porous film.

8. A respirator using a folded filter unit according to claim 5.

* * * * *